(12) United States Patent
Spiegl et al.

(10) Patent No.: US 10,875,220 B2
(45) Date of Patent: Dec. 29, 2020

(54) METHOD AND MOLD FOR PRODUCING SEALING PLATES BY INJECTION MOLDING

(71) Applicant: HOERBIGER KOMPRESSORTECHNIK HOLDING GMBH, Vienna (AT)

(72) Inventors: Bernhard Spiegl, Vienna (AT); Marian Janko, Vienna (AT)

(73) Assignee: Hoerbiger Kompressortechnik Holding GmbH, Vienna (AT)

( * ) Notice: Subject to any disclaimer, the term of this patent is extended or adjusted under 35 U.S.C. 154(b) by 266 days.

(21) Appl. No.: 16/057,304

(22) Filed: Aug. 7, 2018

(65) Prior Publication Data

US 2018/0361637 A1    Dec. 20, 2018

Related U.S. Application Data

(62) Division of application No. 14/482,532, filed on Sep. 10, 2014.

(30) Foreign Application Priority Data

Sep. 24, 2013  (AT) .............................. A 50613/2013

(51) Int. Cl.
| | |
|---|---|
| *B29C 45/00* | (2006.01) |
| *B29K 301/00* | (2006.01) |
| *B29K 101/00* | (2006.01) |

(52) U.S. Cl.
CPC ...... *B29C 45/0046* (2013.01); *B29C 45/0025* (2013.01); *B29C 45/0005* (2013.01); *B29C 2045/0031* (2013.01); *B29K 2101/00* (2013.01); *B29K 2301/00* (2013.01); *Y10T 137/85938* (2015.04)

(58) Field of Classification Search
None
See application file for complete search history.

(56) References Cited

U.S. PATENT DOCUMENTS

| | | | | | |
|---|---|---|---|---|---|
| 5,225,136 | A | * | 7/1993 | Furugohri | ........... B29C 45/0025 264/328.8 |
| 5,476,629 | A | * | 12/1995 | Yabe | .................. B29C 45/0025 264/328.12 |
| 5,484,563 | A | * | 1/1996 | Miyazaki | ............ B29C 45/0025 264/328.12 |

(Continued)

FOREIGN PATENT DOCUMENTS

| | | |
|---|---|---|
| JP | H0416317 A | 1/1992 |
| JP | H04156322 A | 5/1992 |

(Continued)

*Primary Examiner* — Edmund H Lee
(74) *Attorney, Agent, or Firm* — Dykema Gossett PLLC

(57) ABSTRACT

To produce sealing plates (1) consisting of a plurality of sealing rings (3) connected by radial webs (2) by injection molding, wall-type guide elements (5) are arranged obliquely to the direction of flow in the mold channel (6) which is therefore initially largely constricted in the region of weld lines (15) formed by the convergence of the fronts of the divided plastic melt streams, said guide elements being moved out of the mold channel (6) during the further filling of same so that the strength is significantly improved in the region of the weld lines (15).

4 Claims, 2 Drawing Sheets

(56) References Cited

U.S. PATENT DOCUMENTS

| | | | | |
|---|---|---|---|---|
| 5,538,413 | A | * | 7/1996 | Gardner ............. B29C 45/0025 264/328.12 |
| 5,833,913 | A | * | 11/1998 | Ellwood ............. B29C 45/0025 264/328.7 |
| 7,406,891 | B2 | | 8/2008 | Miyasaka |
| 8,119,049 | B1 | * | 2/2012 | Pollmann .......... B29C 45/14073 264/272.14 |
| 2003/0122281 | A1 | | 7/2003 | Osawa et al. |
| 2004/0241276 | A1 | * | 12/2004 | Miyasaka .............. B29D 15/00 425/543 |
| 2007/0104581 | A1 | * | 5/2007 | Stagg ................... F04D 29/326 416/189 |
| 2008/0149196 | A1 | | 6/2008 | Spiegl et al. |
| 2012/0152379 | A1 | | 6/2012 | Lagler et al. |

FOREIGN PATENT DOCUMENTS

| | | | |
|---|---|---|---|
| JP | H068293 | A | 1/1994 |
| JP | 06091698 | * | 4/1994 |
| JP | H08188001 | A | 7/1996 |
| JP | 5244256 | B1 | 7/2013 |
| WO | 0124986 | A1 | 4/2001 |

* cited by examiner

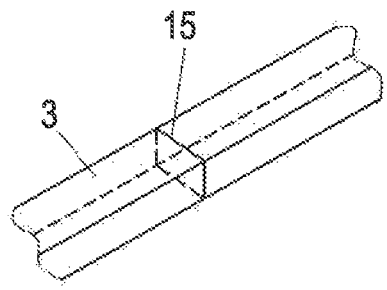
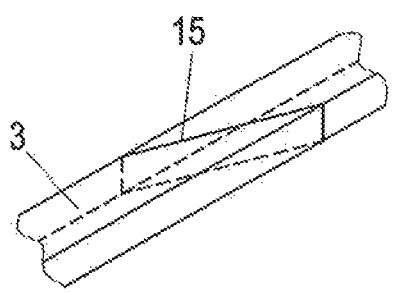
Fig. 4  Fig. 5
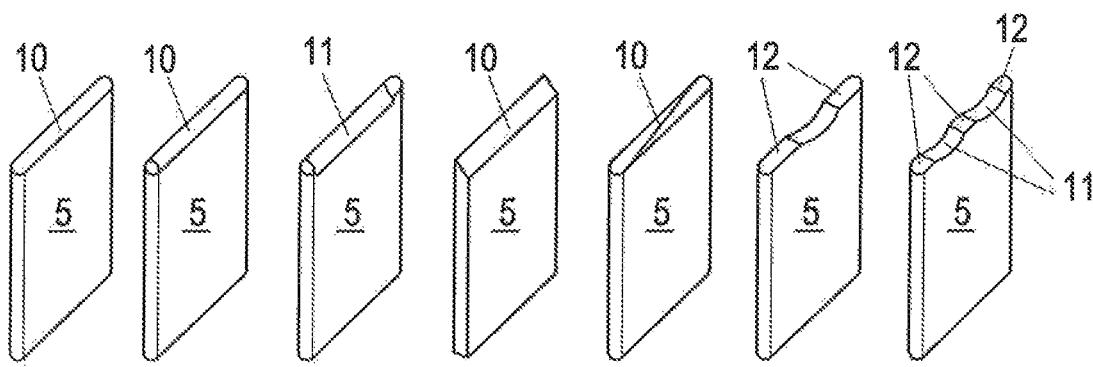
Fig. 6  Fig. 7  Fig. 8  Fig. 9  Fig. 10  Fig. 11  Fig. 12
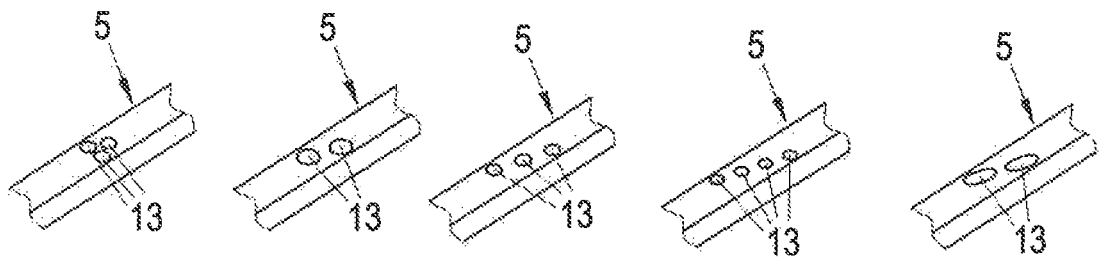
Fig. 13  Fig. 14  Fig. 15  Fig. 16  Fig. 17

METHOD AND MOLD FOR PRODUCING SEALING PLATES BY INJECTION MOLDING

CROSS-REFERENCE TO RELATED APPLICATION

This application is a division of application Ser. No. 14/482,532, filed Sep. 10, 2014, the priority of which is hereby claimed.

BACKGROUND OF THE INVENTION

Field of the Invention

The invention relates to a method and a mold for producing sealing plates of fiber-reinforced plastic by injection molding, wherein the sealing plates consist of a plurality of sealing rings connected by radial webs. In addition, the invention also relates to sealing plates produced by such a method and/or using such a mold.

The Prior Art

Plate valves having a large number of through-holes arranged concentrically are used in general as the intake valves and discharge valves of reciprocating compressors that have a large stroke volume. These through-holes are either covered by a one-piece sealing plate made of steel or plastic or they cooperate with individual profiled rings. Although the one-piece sealing plates permit a relatively uniform load on the sealing surfaces and stop surfaces, which are under great stress during opening and closing as a result of the compulsory joint movement of all regions of the plate, they also have disadvantages with regard to flow deflection and the associated flow losses as a result of the sealing surfaces, the coordinated movement of which is complicated to implement. However, valves having individual sealing rings of fiber-reinforced plastic may be designed relatively easily with sealing surfaces (as so-called profiled rings), which are positioned at an angle in the flow-through direction, which results in less deflection of the flow and thus lower flow losses. Profiled plate valves having sealing plates of the type defined above are a type of hybrid, having the advantages of the one-piece unprofiled sealing plates (joint movement) and the advantages of the individual profiled sealing rings (efficiency, sturdiness).

Flat or profiled sealing plates made of fiber-reinforced plastic are milled from semifinished disks according to the prior art that has been customary in the past and then are reground. This requires a substantial manufacturing expense and outlay of materials, which in turn has a negative influence on costs. Such sealing plates are therefore today finished by injection molding in smaller quantities, i.e., all the slots and/or through-holes in the sealing plate are mapped and modeled in the mold accordingly, so that the sealing plate is already in its final form after injection molding. To improve the imperviousness, the sealing plates may also be reground and/or re-lathed after injection molding.

Although this technology is efficient per se, it still has disadvantages: because of geometry of the sealing plate, the melt streams are divided during the injection molding process and fill up the channels that are to be filled from both sides. A weld line is formed when the melt fronts converge. In the case of fiber-reinforced plastics, an effect can be observed whereby no fibers pass through the weld line and therefore there is no reinforcing effect. As a result, the strength of the weld line hardly reaches the strength level of the base material.

The problem of inadequate weld line strength has been known for a long time and there are various ideas for counteracting it. In addition to optimized process management, such as injection speed, pressure profile and venting of the mold, overflow channels for blurring the weld lines are also known. In many cases, the problem is achieved by a change in design and the weld line is shifted out of the high stress zones. Ideas such as alignment of fibers by means of electrostatic fields are not feasible because of the high viscosities of the plastics that are used. It would be possible theoretically to penetrate or blur the weld lines during or after their development by means of needle shut-off valves controlled in a timely fashion but this could not be implemented technically with sealing plates having up to 60 weld lines per plate. Methods using overflow regions located outside of the weld line, with or without activation, are known but cannot be used because of their complexity and the space required.

The object of the present invention is to improve upon a method and a mold of the type defined in the introduction for producing such valve plates, so that the problems described here with the resulting weld lines can at least be prevented for the most part and thus a sealing plate of the type defined in the introduction can be produced by injection molding, so that it will not have the disadvantages, such as those described here, of such sealing plates known in the past.

SUMMARY OF THE INVENTION

This object is achieved according to the present invention with a method of the type defined in the introduction by the fact that in the region of weld lines formed by the convergence of the fronts of the divided plastic melt streams, wall-type guide elements are arranged obliquely to the direction of flow in the mold channel, which is thus initially largely constricted and which deflects the fronts of the melt flows before they converge, each laterally to the opposite border of the mold channel and are moved out of the mold channel during further filling thereof. Thus, the respective weld line in the mold channel is rotated obliquely, so that the melt fronts approaching from both sides are each deflected to one side. The rate of flow here increases due to the constriction of the cross section, and the fibers of the fiber reinforcement in the plastic are strongly oriented at the respective end of the wall-type guide element. After the melt fronts have reached the tip of the narrowing channel, a pressure begins to build up, so that essentially the melt is only then forced into the gap beneath the movable wall-type guide element. Therefore, pressure also begins to build up beneath this guide element. When the respective wall-type guide element moves upward out of the mold channel during its further filling, an oblique weld line begins to develop, such that the reinforcing fibers in the fiber-reinforced plastic also move at least partially upward on both sides of the guide element, which is itself moving upward, and therefore they pass through the weld line, so that these oblique elongated weld lines are now also penetrated by reinforcing fibers of the respective plastic bodies connected at the weld lines. This effect can be optimized through suitable temperature management of the melt and the molds, so that an approx. 60% improvement can be achieved with static loads, and with regard to the fatigue strength, an approx. 100% improvement in the weld line strength has been demonstrated.

According to one embodiment of the method according to the invention, the plastic melt is introduced into the mold from the center of the sealing plate outward, preferably separately for each radial web, with the guide elements being arranged exclusively in the region of the sealing rings. This results in weld lines exclusively in the region of the sealing rings, which are under less load than the radial webs, which not only must transfer forces between the rings but should also have enough elasticity to improve the sealing behavior of the individual rings.

According to another embodiment of the invention, the movement of the guide elements out of the mold channel takes place against an externally applied resistance force, due to the plastic melt itself which fills up the mold channel, such that the size of this resistance force over time can be varied advantageously during the filling of the mold. It is thus possible in a very simple and effective manner to influence the development of the weld line as well as the reinforcement that ultimately occurs due to the fibers of the fiber reinforcement passing through this weld line in the finished sealing plate.

In the region of weld lines formed by the convergence of the fronts of the divided plastic melt streams, the mold according to the invention for producing such sealing plates by the method described here has wall-type guide elements obliquely to the direction of flow of the melt streams in the mold channel, said mold channel being thereby largely constricted, so that these guide elements can be moved between an initial position, in which 1-10%, preferably 4-6%, especially 5% of the mold channel is cleared, and 0-20%, preferably 5-15%, especially 10% of the mold channel is cleared at the bottom, and a retracted position, in which the end face of the guide element facing the mold channel bottom forms a seal with a surrounding mold channel wall or is slightly raised above it, preferably amounting to 1-10% of the thickness of the sealing plate. With these designs of wall-type guide elements and/or their extent in relation to the surrounding mold channel walls, optimum conditions are created for deflecting and influencing the melt streams in the region of the resulting weld lines accordingly, which results in optimum sealing plates with the aforementioned improved strength results.

In a further embodiment of the mold according to the invention for producing the sealing plates, the injection ports are situated in the region of the center of the mold, preferably separately for each mold channel of each radial web, and the wall-type guide elements are arranged exclusively in the mold channel of the sealing rings. As already mentioned, in the finished sealing plate, this results in weld lines only in the region of the sealing rings, but not in the region of the radial webs.

In another embodiment of the invention, the wall-type guide elements may be designed in one piece, which facilitates the guidance of the melt. However, according to another preferred embodiment of the invention, these guide elements may also consist of a plurality of individual elements, which are arranged side by side with a slight distance between them, preferably being jointly movable, which facilitates the production of the mold in particular when the individual elements are like pins having a round cross section, for example.

According to another refinement of the invention, the wall-type guide elements are designed with a curvature in the circumferential direction of the sealing rings, so that in the curved mold channels of the individual sealing rings the same constriction of the cross section on both sides of the wall-type guide elements may be set as the goal.

In another embodiment of the invention, it is provided that the wall-type guide elements are rounded on the exterior side edges and are designed to be rounded or with a roof-type point on the end face, which is turned toward the mold channel bottom. It is thus possible to have an influence on the flow past and/or below at the side and on the lower end face of the guide elements within a wide range, which allows a wide variety of influences on the development of formation of the weld lines.

In the context mentioned last, another advantageous embodiment of the invention is one in which the end face of the wall-type guide elements facing the mold channel bottom has individual flow-through regions that are set back with respect to the end face, which is upright in the initial position on the mold channel bottom. This yields a precisely definable geometry of the initial position with a very specific free cross section for flow beneath the guide elements before they are moved out of the mold.

In a particularly preferred embodiment of the invention, the wall-type guide elements are arranged in the mold channel at an angle of 10-35°, preferably 15°, in deviation from the respective circumferential tangent to the mold channel, which thus yields a constriction in the direction of flow of the plastic melt, preferably continuously. Thus, when the melt front encounters the obstacle formed at the front by the guide elements in the mold channel, this results in optimum development of the effects described above.

In another embodiment of the invention, the wall-type guide elements are put under a load by means of springs and/or by hydraulic, pneumatic or electrical actuators or a combination thereof, preferably with a load force that can be varied over the chronological course of the variable. This permits the desired influence on the movement of the wall-type guide elements to yield the desired development of the weld lines in a manner that is simple but can also be controlled.

The wall-type guide elements may simply be arranged flatly or with an oblique curvature in the respective mold channel—but individual ones or all of the guide elements may be bent in a V shape apart from that—and a plurality of the above-mentioned individual elements may also be provided in any groups, which thus permits a further influence on the development and formation of the weld lines.

BRIEF DESCRIPTION OF THE DRAWINGS

The present invention is explained in greater detail below on the basis of the exemplary embodiments which are illustrated schematically in the drawings.

FIGS. 6 through 12 show various designs of wall-type guide elements for use in methods and molds according to the present invention, and FIGS. 13 through 17 show different arrangements of wall-type guide elements consisting of individual elements.

DETAILED DESCRIPTION OF THE DEPICTED EMBODIMENTS

Figure 1:
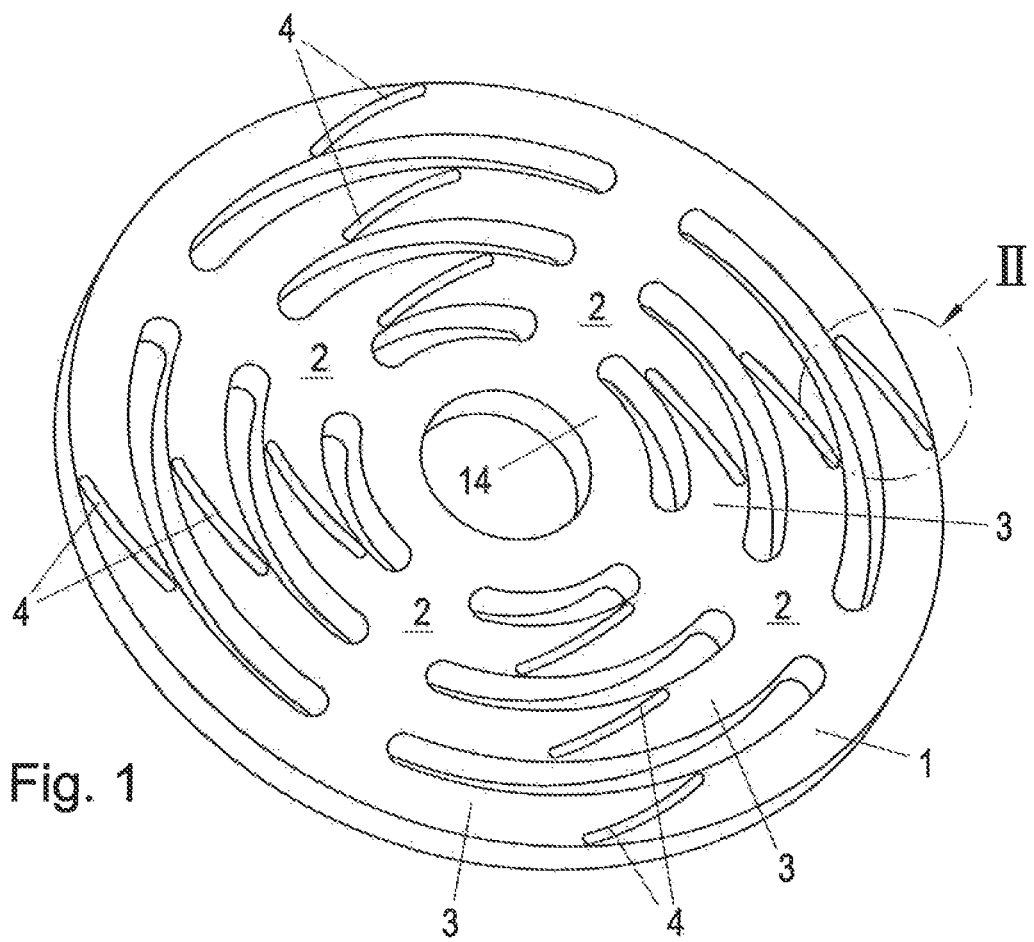
FIG. 1 shows an sealing plate according to the invention, which is not profiled here for example, shown in a perspective view.

The sealing plate 1 shown in FIG. 1 consists of three sealing rings 3 connected by radial webs 2 and is made of fiber-reinforced plastic by injection molding. This shows the sealing side of the sealing plate which in the finished plate valve (not shown here) cooperates with the valve seat—this is the sealing plate with a flat sealing surface, which is yet to be reground after injection molding to improve the imperviousness. The sealing plate 1 according to FIGS. 1 and 2 has not yet been ground over, which is why sickle-shaped elevations 4 can still be recognized and their development and function are described in greater detail below. However, apart from flat sealing plates according to FIGS. 1 and 2, it is also possible to manufacture so-called profiled sealing plates according to the invention; the individual sealing rings 3 with these profiled sealing plates are provided with a chamfer around the circumference, and these chamfers in turn cooperate with the corresponding sealing surfaces on the valve seat (not shown)—in this case, the radial webs 2 would be formed with a recess on the sealing side opposite these lateral chamfers.

In injection molding of the sealing plate 1 shown here, fiber-reinforced plastic is supplied with plastic melt from the innermost ring 14 which has a cone gate, for example, which is not shown here but is used for supplying melt to the mold channels for the radial webs 2. During the ongoing filling of the mold, four melt streams first flow outward along the radial webs 2 and each is divided to the right left and to the left at the intersections with the sealing rings 3. These divided streams of molten plastic thus fill up the mold channels for the sealing rings 3 from both ends and converge in the central region between the radial webs 2. In the absence of the wall-type guide elements 5 according to the invention (see FIG. 3 and FIGS. 6 through 17), weld lines 15 essentially like those in FIG. 4 would be obtained in the region of the convergence of the fronts of the two melt streams, but this would result in a reduced strength of the sealing plate 1 in this region, in particular in a case of fiber-reinforced plastic melts, because the fibers of the fiber reinforcement of the two converging melt streams would not pass through the weld line 15 and therefore would not provide any reinforcement there.

Figure 2:
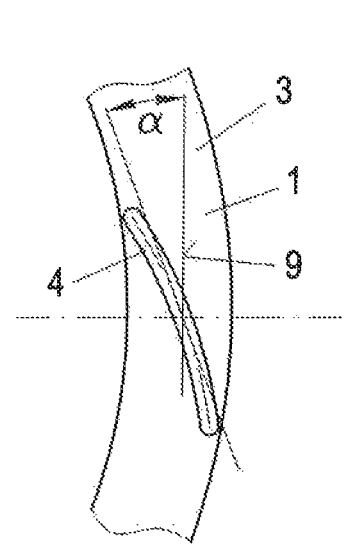
FIG. 2 shows the enlarged detail II from FIG. 1 in a view from above.
Figure 3:
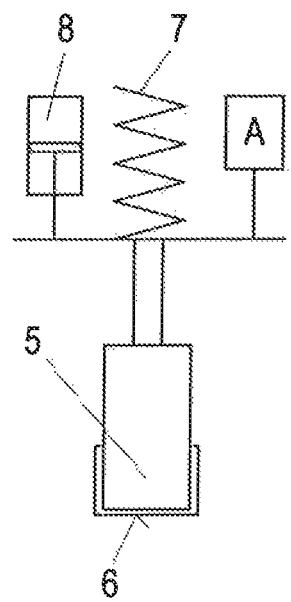
FIG. 3 shows a schematic diagram of a shape for producing a sealing plate according to FIGS. 1 and 2, FIGS. 4 and 5 show schematically the weld lines of the type to be adjusted in the production of a sealing plate (FIG. 4 without and FIG. 5 with wall-type guide elements according to the present invention)

Therefore, in the method according to the present invention, a wall-type guide element 5 is arranged obliquely to the direction of flow in the mold channel 6 which is therefore initially largely constricted, as represented schematically in FIG. 3, in the region of the weld lines 15 formed by the convergence of the fronts of the divided plastic melt streams. These guide elements 5 are moved out of the mold channel 6 during the further filling of same (toward the top in FIG. 3), namely being moved out of the initial position depicted in FIG. 3 into a retracted position, in which the bottom side near the mold wall forms a seal with the surrounding mold channel wall or is raised slightly above same. Raising the guide elements slightly above the surrounding mold channel wall causes the elevations 4 to be formed, as depicted in FIGS. 1 and 2, which are then removed in regrinding the sealing plate 1.

According to FIG. 3, the movement of the guide elements 5 may take place either simply by means of the pressure occurring between mold channel bottom and the guide element 5 in the continued filling in the plastic feed (against the force of a spring 7) or by means of an actuator A, for example, an electric actuator, or by means of a pneumatic or hydraulic cylinder 8 or a combination thereof, such that the chronological course of the movement or of the acting opposing pressure can also be controlled here in a manner which is not depicted further.

It can be seen clearly from FIG. 2 that with the mold used for this sealing plate 1 the wall-type guide elements 5 are curved in the circumferential direction of the sealing rings 3 and have rounded areas on the outer side edges. The angle α formed by the wall-type guide elements 5 with the circumferential tangent 9 of the sealing rings 3 and/or of the corresponding mold channel is preferably in the range of 10-35° with which the melt streams striking the guide elements 5 from both sides are deflected accordingly, such that the elevated pressure due to the constriction of the mold channel to an equal extent on both ends is also built up beneath the guide elements 5, tending to displace them upward out of the mold channel in the course of further filling. This yields a strong alignment of the fibers of the fiber reinforcement in the plastic melt along the guide elements 5 moving upward out of the mold, which results in the desired inclined position of the weld line 15 (see FIG. 5) with simultaneous penetration of same with fibers of the fiber reinforcement from both melt streams. In the initial position of the wall-type guide elements 5 depicted in FIG. 3, approx. 5% of the mold channel is preferably cleared on both sides and approximately 10% is cleared at the bottom, which yields a very advantageous design of the weld line 15 with excellent strength values for the sealing plate 1.

Various possibilities for advantageous design of the end faces 10 of the wall-type guide elements 5 are illustrated in FIGS. 6 through 12, such that the term "end face 10" is to be understood to refer to the bottom side of the guide elements 5 facing the mold channel bottom according to FIG. 3, said bottom side constricting the mold channel at the bottom in the initial position. The end face 10 is designed to be straight in FIG. 6 (as also indicated in FIG. 3). According to FIG. 7, the end face 10 is provided with a rounded area over the entire length. FIG. 8 shows an inclination at the center, such that the edge regions are not inclined and therefore the guide element 5 can be set in the initial position on the mold bottom. FIGS. 9 and 10 show rooftop-shaped slopes of the end face 10, such that in the embodiment according to FIG. 10, the first edge of this inclined surface runs from one side of the guide element to the other, which has a targeted influence on the flow beneath the guide elements 5 and thus has a targeted influence on the design of the resulting weld line. The discussion according to FIGS. 11 and 12 includes flow-through regions 11 and exterior regions 12 standing upright on the mold channel bottom in the initial position.

However, apart from the design of the wall-type guide elements 5 according to FIG. 3 and FIGS. 6 through 12 as one-piece parts, these guide elements 5 according to FIGS. 13 through 17 could also consist of a plurality of individual elements, labeled as 13 here, that are arranged side by side with a small distance between them and are preferably jointly movable. According to FIGS. 13 through 16, pins having a round cross section are used—the cross section of these individual elements 13 is oval according to FIG. 17. This also results in a wide variety of possibilities for influencing the melt streams in the region of the resulting weld lines. In addition, weld lines can be produced with the guide elements 5 according to FIGS. 6 through 12, as well as with those according to FIGS. 13 through 17; in deviation from FIG. 5, it is possible to manufacture these guide elements not only to stand essentially obliquely, but also to have V-shaped or similar geometries, which can likewise contribute toward an improvement in the quality of the resulting sealing plates 1.

The invention claimed is:

1. A method of producing a fiber-reinforced plastic sealing plate which includes a plurality of sealing rings connected by radial webs, the method comprising the sequential steps of:
- (a) providing a mold having channels for forming the sealing plate,
- (b) positioning a guide element obliquely in a channel of the mold in which a sealing ring of the sealing plate is formed,
- (c) injecting a plastic melt of fiber-reinforced plastic into the mold so as to flow into the channels therein with plastic melt, including the channel in which the guide element is positioned, the guide element restricting flows of plastic melt converging from opposite directions in the channel in which the guide element is positioned and deflecting fronts of the converging flows towards respective opposite sides of the channel, the converging flows meeting along an oblique weld line, and
- (d) moving the guide element out of the channel in which the guide element is positioned to result in reinforcing fibers from the converging melt flows passing through a formed oblique elongated weld line and thereby produce the sealing plate.

2. The method according to claim 1, wherein in step (c) the fiber-reinforced plastic is injected into the mold where a center of the produced sealing plate is located.

3. The method according to claim 1, wherein in step (d) the guide element is moved out of the channel by pressure of the converging melt flows acting against an external resistance force applied to the guide element.

4. The method according to claim 3, including varying the resistance force applied to the guide element during injecting of the plastic melt into the mold.

\* \* \* \* \*